United States Patent
Dreano et al.

(10) Patent No.: US 11,236,673 B2
(45) Date of Patent: Feb. 1, 2022

(54) TURBOMACHINE BLADE COMPRISING AN INTERNAL FLUID FLOW PASSAGE EQUIPPED WITH A PLURALITY OF OPTIMALLY ARRANGED DISRUPTIVE ELEMENTS

(71) Applicant: SAFRAN AIRCRAFT ENGINES, Paris (FR)

(72) Inventors: Sébastien Vincent François Dreano, Moissy-Cramayel (FR); Mohammed-Lamine Boutaleb, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/058,225

(22) PCT Filed: May 28, 2019

(86) PCT No.: PCT/FR2019/051240
§ 371 (c)(1),
(2) Date: Nov. 24, 2020

(87) PCT Pub. No.: WO2019/229362
PCT Pub. Date: Dec. 5, 2019

(65) Prior Publication Data
US 2021/0156309 A1    May 27, 2021

(30) Foreign Application Priority Data
May 29, 2018  (FR) ...................... 1854567

(51) Int. Cl.
*F01D 9/06*    (2006.01)
*F02C 7/14*    (2006.01)
*B33Y 80/00*    (2015.01)

(52) U.S. Cl.
CPC ............... *F02C 7/14* (2013.01); *F01D 9/065* (2013.01); *B33Y 80/00* (2014.12);
(Continued)

(58) Field of Classification Search
CPC . F01D 9/065; F02C 7/14; B33Y 80/00; Y02T 50/60; F05D 2220/36;
(Continued)

(56) References Cited

U.S. PATENT DOCUMENTS

| 8,616,834 B2 | 12/2013 | Knight, III et al. |
| 2017/0284417 A1 | 10/2017 | Zaccardi et al. |

(Continued)

FOREIGN PATENT DOCUMENTS

| EP | 3144485 A1 | 3/2017 |
| FR | 2989110 A1 | 10/2013 |
| FR | 3046811 A1 | 7/2017 |

OTHER PUBLICATIONS

Search Report issued in French Patent Application No. 1854567 dated Feb. 1, 2019.
(Continued)

*Primary Examiner* — Igor Kershteyn
(74) *Attorney, Agent, or Firm* — Pearne & Gordon LLP

(57) ABSTRACT

An aircraft turbomachine blade includes an aerodynamic part manufactured in one piece by additive manufacturing, this aerodynamic part including a pressure-side wall, a suction-side wall and an internal fluid passage, this internal fluid passage being crossed by a plurality of disruptive elements that each connect the pressure-side wall to the suction-side wall, being irregularly spaced apart according to varied parameters in a chosen and optimized range, the junction of the disruptive elements with the pressure-side
(Continued)

and suction-side walls not following a particular arrangement along the internal passage so as to form a disorderly arrangement.

11 Claims, 5 Drawing Sheets

(52) U.S. Cl.
CPC ...... *F05D 2220/36* (2013.01); *F05D 2230/31* (2013.01); *F05D 2230/53* (2013.01); *F05D 2240/12* (2013.01); *F05D 2260/213* (2013.01); *F05D 2260/221* (2013.01)

(58) Field of Classification Search
CPC ............. F05D 2230/53; F05D 2230/31; F05D 2240/12; F05D 2260/213; F05D 2260/22141
See application file for complete search history.

(56) References Cited

U.S. PATENT DOCUMENTS

| | | | |
|---|---|---|---|
| 2019/0001402 A1* | 1/2019 | Yang | B22C 9/22 |
| 2019/0001403 A1* | 1/2019 | Yang | B33Y 10/00 |
| 2019/0001404 A1* | 1/2019 | Yang | B22D 29/002 |
| 2019/0001405 A1* | 1/2019 | Yang | B22D 29/002 |
| 2019/0001522 A1* | 1/2019 | Yang | B22C 7/02 |
| 2019/0078452 A1 | 3/2019 | Zaccardi et al. | |
| 2019/0186293 A1 | 6/2019 | Boutaleb et al. | |
| 2019/0195074 A1* | 6/2019 | Mongillo, Jr | F01D 25/12 |
| 2019/0338661 A1 | 11/2019 | Zaccardi et al. | |
| 2021/0156309 A1* | 5/2021 | Dreano | F02C 7/14 |

OTHER PUBLICATIONS

International Search Report issued in Application No. PCT/FR2019/051240 dated Oct. 23, 2019.
Written Opinion issued in Application No. PCT/FR2019/051240 dated Oct. 23, 2019.
Application document as-filed for patent application entitled: Method for Controlling the Supply of Fuel to a Combustion Chamber of a Turbine Engine, Fuel Supply System and Turbine Engine, U.S. Appl. No. 16/957,648, filed Jun. 24, 2020.

* cited by examiner

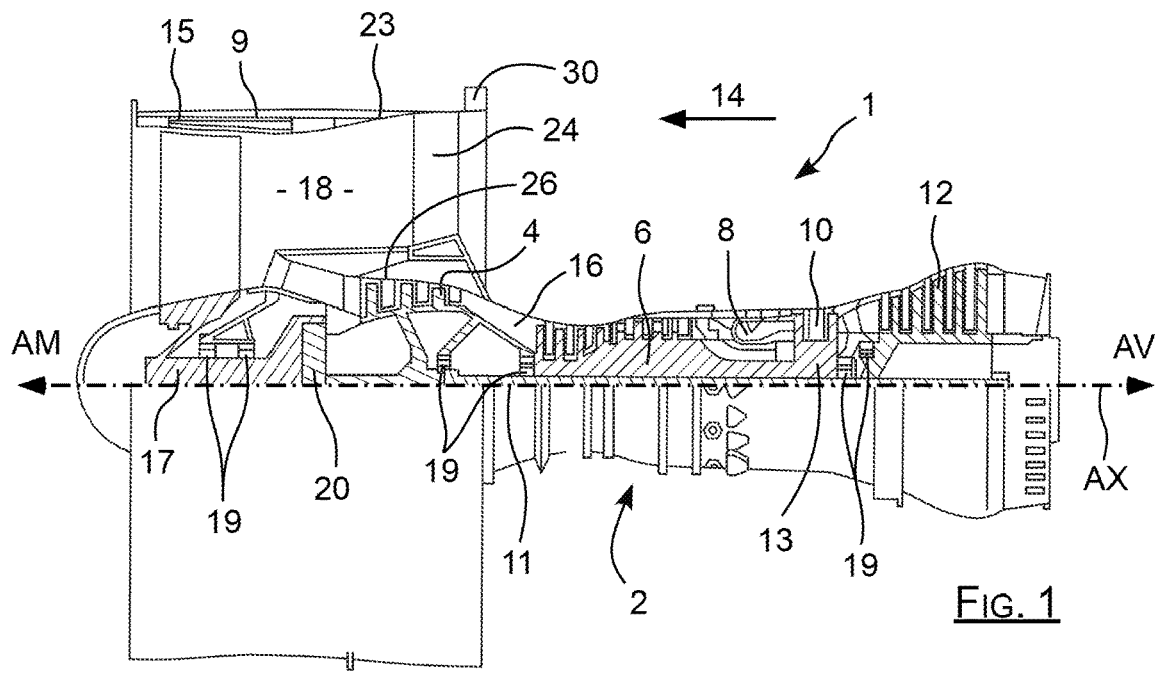
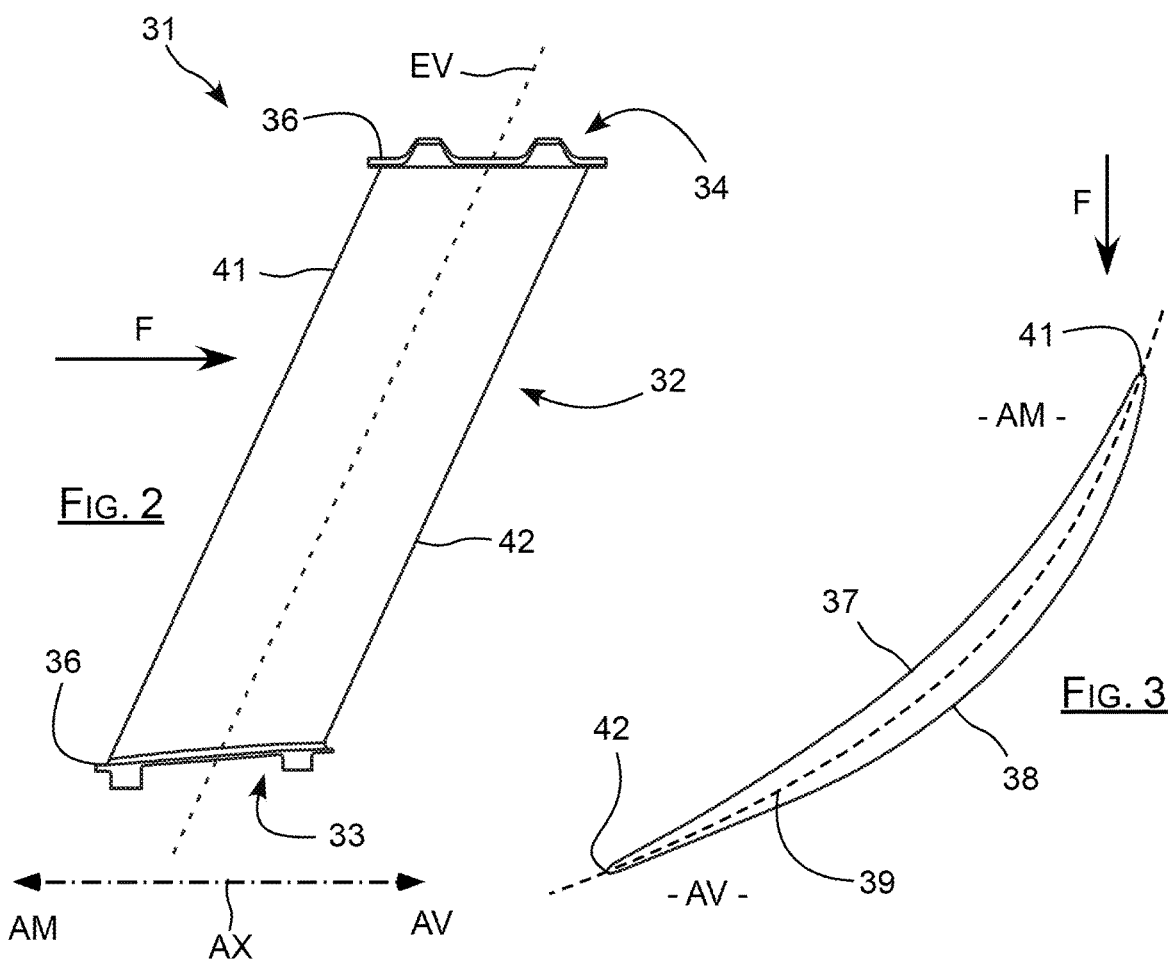

FIG. 4
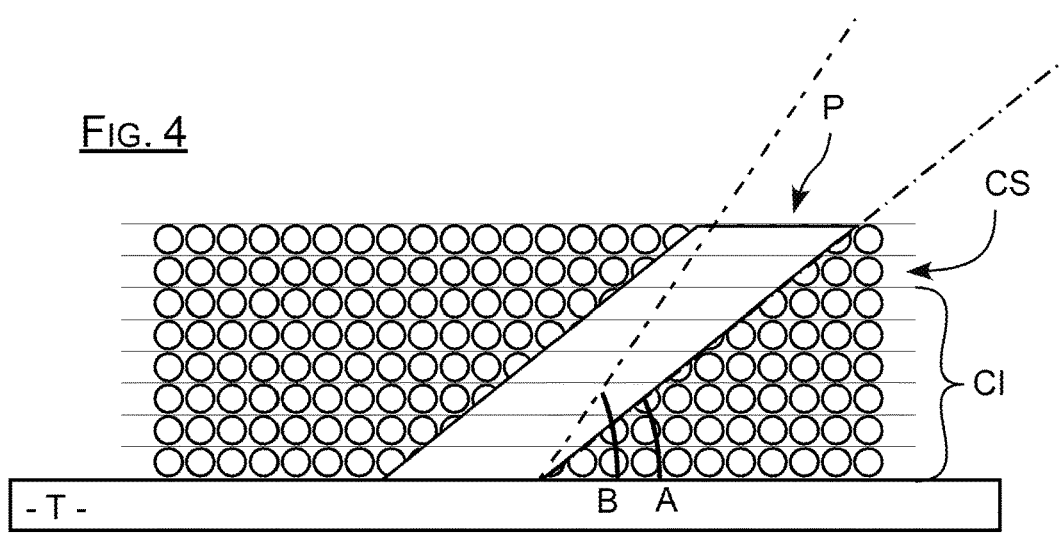
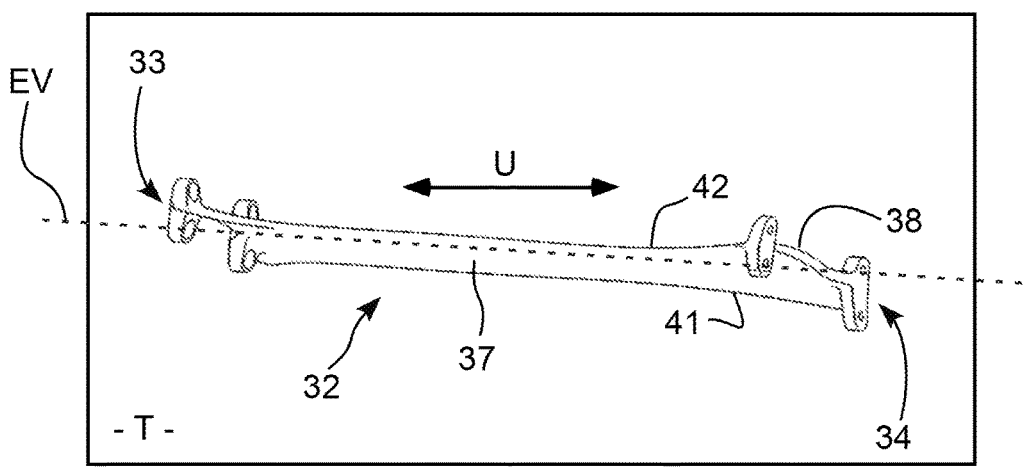
FIG. 5
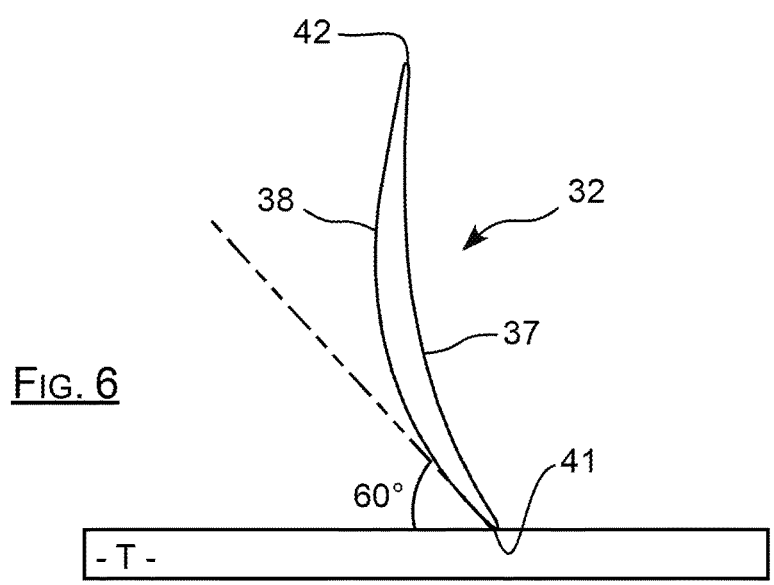
FIG. 6

TURBOMACHINE BLADE COMPRISING AN INTERNAL FLUID FLOW PASSAGE EQUIPPED WITH A PLURALITY OF OPTIMALLY ARRANGED DISRUPTIVE ELEMENTS

This is the National Stage of PCT international application PCT/FR2019/051240, filed on May 28, 2019 entitled "TURBOMACHINE BLADE COMPRISING AN INTERNAL FLUID FLOW PASSAGE EQUIPPED WITH A PLURALITY OF OPTIMALLY ARRANGED DISRUPTIVE ELEMENTS", which claims the priority of French Patent Application No. 1854567 filed May 29, 2018, both of which are incorporated herein by reference in their entirety.

TECHNICAL FIELD

The present invention relates to the design of an aircraft turbomachine vane arranged in all or part of an air flow and forming a heat exchange surface between said air flow and a fluid circulating therein.

STATE OF THE RELATED ART

On certain dual-flow turbomachines, it is known to install outlet guide vanes downstream from the fan to rectify the flow discharged therefrom, to supply a secondary flow generating a main thrust, and also optionally to fulfil a structural function. The latter function is intended to enable the transfer of the loads from the centre of the turbomachine, to an outer ferrule located extending from the fan casing. In this scenario, an engine mount is conventionally arranged on or in the vicinity of this outer ferrule, to carry out the fastening between the turbomachine and an aircraft support mast.

It has been proposed to use these guide vanes as substitute heat exchangers, referred to as OGV exchangers. This involves a heat exchanger function between the air of the secondary flow which flows along the aerodynamic profile of the vane, and a hydraulic lubrication fluid circulating therein. This additional heat exchanger function was described in the document U.S. Pat. No. 8,616,834 which envisages integrating a flow conduit equipped with fins mounted between the two aerodynamic walls of the vane, or indeed the document FR 2 989 110 wherein the vane is formed of several portions delimiting different flow passages to increase the exchange surface. These fins indeed form disruptive elements of the flow traversing the hydraulic fluid flow conduit.

The hydraulic fluid intended to be cooled by the outlet guide vanes can originate from different areas of the turbomachine. Indeed, it can consist of a fluid circulating through the lubrication chambers of the rolling bearings supporting the engine shafts and/or the fan hub, or indeed a fluid intended for the lubrication of the mechanical transmission elements of the accessory gearbox (AGB). Finally, it can also serve for the lubrication of a fan drive reduction gear, when such a reduction gear is provided on the turbomachine in order to reduce the rotational speed of the fan thereof.

Increasing lubricant needs necessitate adapting the heat dissipation capacity, associated with the exchangers intended for lubricant cooling, accordingly. Assigning a role of heat exchanger to the outlet guide vanes, as in the solutions of the two documents cited above, makes it possible in particular to reduce, or remove conventional ACOC (Air-Cooled Oil Cooler) type exchangers. These ACOC exchangers being generally arranged in the secondary stream, the reduction/removal thereof makes it possible to limit disruptions of the secondary flow, and thus increase the overall efficiency of the turbomachine.

In practice, using usual assembly methods for manufacturing the complex-shaped vane does not guarantee contact at all points between all of the fins and the walls. This aspect penalises the overall mechanical resistance of the vane, reduces the effective transfer due to conduction and induces leaks due to the high pressures generated by the circulation of the hydraulic fluid. Furthermore, a modification of the vane profile to increase the heat exchange potential further is carried out frequently to the detriment of performances in terms of aerodynamics.

This situation leads to reconsidering the manufacturing method by adopting the powder-bed additive manufacturing method, by stacking layers of parallel materials together from a manufacturing plate. More specifically, the metal laser melting additive manufacturing technique has been envisaged, with fins made of one piece with the aerodynamic walls.

Following on from the implementation using additive manufacturing, the aim of the invention is that of proposing a vane comprising an internal fluid passage equipped with fins, referred to as disruptive elements, the geometric configuration whereof makes it possible to increase the exchange efficiency to meet growing performance needs, while increasing the strength of the vane.

DESCRIPTION OF THE INVENTION

To at least partially meet this need, the invention relates to an aircraft turbomachine vane comprising an aerodynamic part extending along a span axis and made of one piece by additive manufacturing, said aerodynamic part comprising a lower surface wall and an upper surface wall comprising respectively an inner lower surface face and an upper surface face, these inner lower and upper surface faces facing one another and delimiting jointly an internal fluid passage comprising at least one channel defining a general fluid propagation direction therein, this channel being traversed by a plurality of flow disruption elements connecting the lower and upper surface walls each having a first connection point on the inner lower surface face, and a second connection point on the inner upper surface face.

According to the invention, the disruptive elements extend in relation to the general fluid propagation direction by forming a variable angle from one disruptive element to another, and the disruptive elements are irregularly spaced from one another such that the first connection points are arranged in a disorganised manner on the inner lower surface face, and/or the second connection points are arranged in a disorganised manner on the inner upper surface face.

With this solution, the heat exchange potential is increased and the mechanical strength of the aerodynamic part is reinforced. In particular, this vane has advantageously an enhanced compatibility with the powder-bed additive manufacturing method by limiting the incidence of the direction of manufacture, which can result in imperfections on the aerodynamic walls due to an organised nature of the disruptive elements of the prior art.

The invention also relates to a vane thus defined, the internal fluid passage comprises a first and a second channel each defining a fluid propagation direction substantially parallel with the span axis, these first and second channels being traversed by disruptive elements the first and second connection points whereof do not follow a specific alignment along the fluid propagation direction.

The invention also relates to a vane thus defined, such that for any connection point among the first connection points (66a) and/or the second connection points arranged in a disorganised manner, this connection point has around same a number N of connection points forming a closed line, delimiting internally a space wherein the single any connection point is found, the distance between the latter is each of said N points is different for at least three thereof, and preferably for each thereof.

The invention also relates to a vane thus defined, such that:
- in a view from inside the fluid passage, along a direction locally substantially orthogonal to and oriented towards the inner lower surface face, all the first connection points thereof are each arranged at the intersection between a primary imaginary line extending parallel with the fluid propagation direction, and a secondary imaginary line perpendicular to the primary imaginary line, all of the first imaginary lines between all distinct from one another and all of the second imaginary lines being all distinct from one another; and/or
- in a view from inside the fluid passage, along a direction locally substantially orthogonal to and oriented towards the inner upper surface face, all the second connection points thereof are each arranged at the intersection between a primary imaginary line extending parallel with the fluid propagation direction, and a secondary imaginary line perpendicular to the primary imaginary line, all of the first imaginary lines being all distinct from one another and all of the second imaginary lines being all distinct from one another.

The invention also relates to a vane thus defined wherein the disruptive elements are spaced pairwise at the nearest point by a distance enabling fluid flow, this distance being preferentially between 2 and 10 mm.

The invention also relates to a vane thus defined, wherein the value of the angle formed between each disruptive element and the fluid propagation direction is between 70 and 110°.

The invention also relates to a vane thus defined, wherein the disruptive elements extend by forming an angle greater than a predefined angle A with respect to a parallel plane with the successive manufacturing layers forming the aerodynamic part of the vane below which these disruptive elements should be supported during manufacture, the angle A being preferentially greater than 30°.

The invention also relates to a vane thus defined, wherein the disruptive elements extend by forming an angle of less than 70° with respect to a parallel plane with the successive layers forming the vane.

The invention also relates to a vane thus defined, wherein the disruptive elements are bars with a cylindrical cross-section of diameter of the order of 1 mm.

The invention also relates to an aircraft engine comprising at least one vane thus defined.

BRIEF DESCRIPTION OF THE DRAWINGS

FIG. 1 is a schematic longitudinal sectional diagram of a dual-flow turbojet engine;

FIG. 2 is a side view of a guide vane according to the invention;

FIG. 3 is a sectional view showing the aerodynamic profile of the guide vane according to the invention;

FIG. 4 is a schematic representation illustrating a collapse problem during the additive manufacture of a part;

FIG. 5 is a top view of a guide vane manufactured in the horizontal direction on a plate of a dedicated machine according to the invention;

FIG. 6 is a sectional view of a guide vane manufactured in the horizontal direction on a plate of a dedicated machine according to the invention;

DETAILED DESCRIPTION OF SPECIFIC EMBODIMENTS

Figure 7:
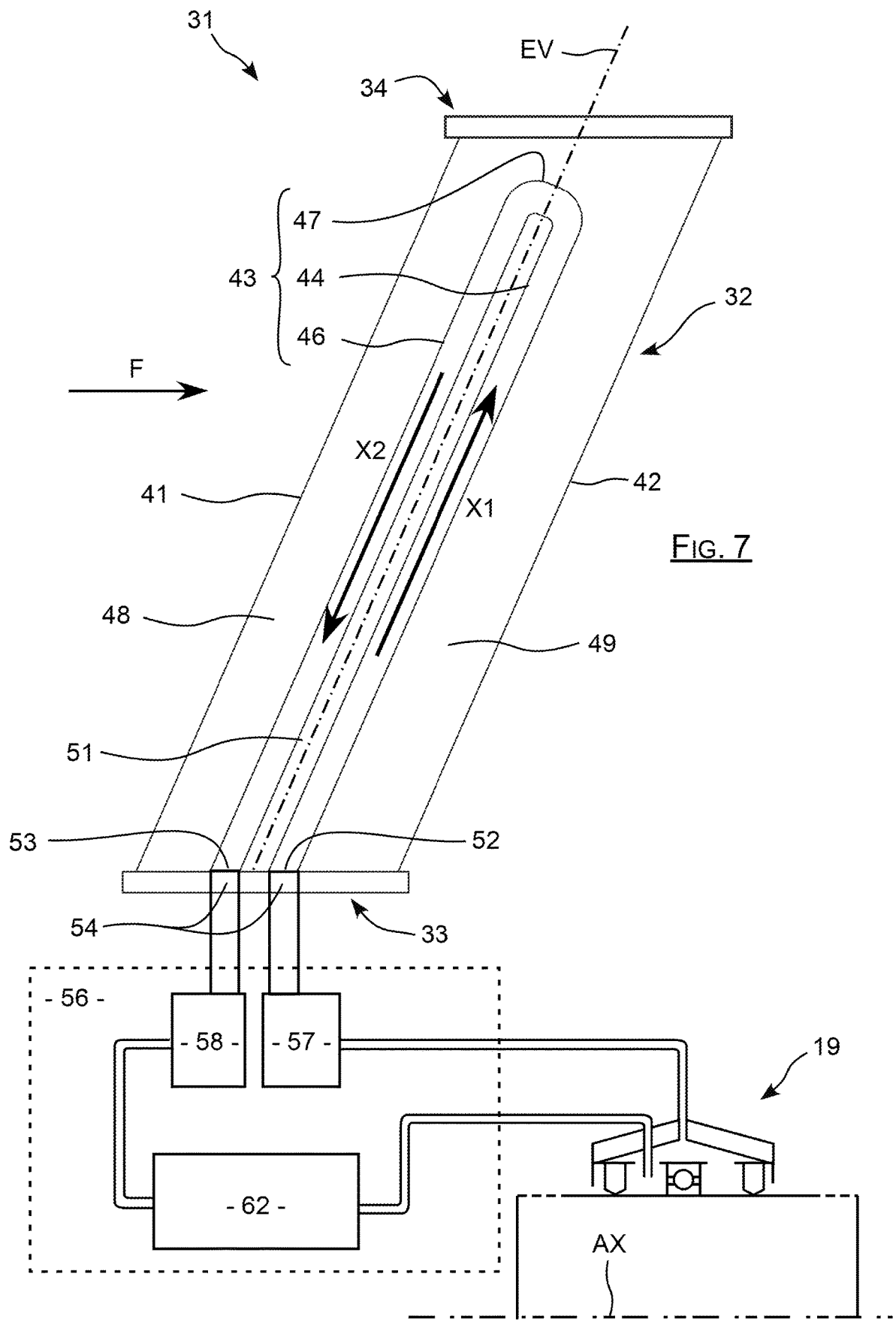
FIG. 7 represents the operation of the heat exchanger formed by the guide vane according to the invention.

With reference to FIG. 1, a dual-flow, double-body turbojet engine 1 of longitudinal axis of revolution AX, having a high bypass ratio, is represented. The turbojet engine 1 includes conventionally a gas generator 2 comprising a combustion chamber 8 on either side whereof a low-pressure compressor 4 and a low-pressure turbine 12 are arranged, this gas generator 2 comprising a high-pressure compressor 6, and a high-pressure turbine 10. Hereinafter, the terms "front" and "rear" are considered according to a direction 14 opposite the main gas flow direction in the turbojet engine, this direction 14 being parallel with the axis AX thereof. On the other hand, the terms "upstream" AM and "downstream" AV are considered according to the main gas flow direction in the turbojet engine.

The low-pressure compressor 4 and the low-pressure turbine 12 form a low-pressure body, and are connected to one another by a low-pressure shaft 11 centred on the axis AX. Similarly, the high-pressure compressor 6 and the high-pressure turbine 10 form a high-pressure body, and are connected to one another by a high-pressure shaft 13 centred on the axis AX and arranged about the low-pressure shaft 11. The shafts are supported by rolling bearings 19, which are lubricated while being arranged in enclosures bathed in hydraulic fluid. The same applies for the fan hub 17, also supported by rolling bearings 19.

The turbojet engine 1 moreover includes, to the front of the gas generator 2 and the low-pressure compressor 4, a single fan 15 which is herein arranged directly to the rear of an air inlet cone of the engine. The fan 15 is rotatable along the axis AX, and surrounded by a fan casing 9. In FIG. 1, it is not driven directly by the low-pressure shaft 11, but merely driven indirectly by this shaft via a reduction gear 20, which enables same to rotate with a slower speed. Nevertheless, a direct drive solution of the fan 15, by the low-pressure shaft 11, falls within the scope of the invention. It should be noted that a direct drive of the fan can be retained without leaving the scope of the invention.

Furthermore, the turbojet engine 1 defines a primary stream 16 intended to be traversed by a primary flow, as well as a secondary stream 18 intended to be traversed by a secondary flow located radially outward with respect to the primary flow, the flow of the fan being therefore split. As known by those skilled in the art, the secondary stream 18 is delimited radially outward, with respect to the axis of rotation of the turbomachine, in part by a preferentially metallic external ferrule 23, extending the fan casing 9 to the rear.

Although this has not been shown, the turbojet engine 1 is equipped with a set of equipment, for example such as a fuel pump, hydraulic pump, alternator, starter, variable angle stator actuator (VSV), discharge valve actuator, or electric power generator. It particularly consists of equipment for the lubrication of the reduction gear 20. These units are driven by an accessory gearbox or AGB (not shown), which is also lubricated.

Downstream from the fan 15, in the secondary stream 18, a ring of guide vanes which are herein outlet guide vanes 31 (or OGV) is provided. These stator vanes 31 connect the outer ferrule 23 to a casing 26 surrounding the low-pressure compressor 4. They are spaced circumferentially in relation to one another, and make it possible to rectify the secondary flow after the passage thereof through the fan 15. Furthermore, these vanes 31 can also fulfil a structural function, as is the case in some embodiment examples which are now described. They transfer the loads from the reduction gear and the rolling bearings 19 of the engine shafts and the fan hub, to the outer ferrule 23. Then, these loads can transit via an engine mount 30 fastened to the ferrule 23 and connecting the turbojet engine to an aircraft support mast (not shown).

Finally, the outlet guide vanes 31 carry out, in the embodiment examples now described, a third heat exchanger function between the secondary air flow traversing the ring of vanes, and the hydraulic fluid circulating inside these vanes 31. The hydraulic fluid intended to be cooled by the outlet guide vanes 31 is that serving for the lubrication of the rolling bearings 19, and/or the turbojet engine equipment, and/or the accessory gearbox, and/or the reduction gear 20. These vanes 31 are thus part of the fluidic circuit(s) wherein the hydraulic fluid is placed in circulation to successively lubricate the associated element(s), then to be cooled.

One of the outlet guide vanes 31 will be described, but it is noted that the invention as it will be described can apply to all the vanes 31 of the stator ring centred on the axis AX, or indeed merely some of these vanes.

According to the invention, the guide vane 31 which appears in FIG. 2 is a metallic part including in particular an aerodynamic part 32, also referred to as blade, intended to be exposed to the secondary flow referenced by F. This aerodynamic part 32 is extended on either end by a foot 33 and a head 34 which fasten the vane 31 to the casing 26 and to the outer ferrule 23. The vane 31 further comprises at the level of the foot thereof and the head thereof, platforms 36 serving to reconstitute a portion of the secondary stream once this vane is set up on the turbomachine.

Designed according to the direction of arrival of the secondary flow F to rectify same, the vane 31 extends along an arched profile from the foot 33 to the head 34 twisted around a so-called span axis EV. This span axis EV can be perpendicular to an axis AX or inclined as shown in FIG. 2.

This aerodynamic part 32 includes a lower surface wall 37 and an upper surface wall 38 which are spaced from one another on either side of a median line of the vane profile, also referred to as skeleton referenced by 39 in FIG. 3. These lower surface 37 and upper surface walls 38 are joined at a first end of the skeleton 39 by a leading edge 41 and at a second end of the skeleton 39 by a trailing edge 42. As a general rule, the skeleton 39 can be split into an upstream half AM and a downstream half AV separated from one another by a median line of the skeleton located midway between the leading edge and the trailing edge.

This guide vane 31 is a metallic part formed of one piece by powder-bed additive manufacturing by being formed of a plurality of successive and parallel material layers, non-restrictively made of aluminium alloy. Powder-bed additive manufacturing denotes the addition of material layer by layer, on a manufacturing plate of a dedicated machine, to form a physical object from a digital model. In the case of a metallic part such as the guide vane 31, the powder-bed laser melting method which consists of melting a part of a thin layer of powder spread by a scraper using a laser at each pass is used.

The powder used for laser melting is not self-supporting. As seen in FIG. 4, during the manufacture of a part P, the non-amalgamated powder of lower layers referenced by CI, i.e. which is not swept by the laser, is not capable of supporting the amalgamated powder of a consecutive upper layer CS below a minimum clearance angle A between the part P and the manufacturing plate T.

To solve this problem, it is known to form while manufacturing the part, supports which support each region having a clearance angle less than a predefined minimum angle A, to prevent a local collapse. The part and the supports are rigidly connected, manufactured at the same time, and made of the same material. Once the additive manufacture is complete, the supports represents "dead", in other words non-functional, material, and must thus be removed by machining.

In the example of the figures, the minimum clearance angle A is defined at 30° with respect to the plate T, and an optimal surface rendering angle B of 60° with respect to the plate below which surface asperities are observed, particularly at part edges.

Given that the upper and lower surface walls 38 and 37 have a warped and therefore difficult to machine profile, whereas they must be free from defects to ensure satisfactory flow properties, it is necessary to orient the vane 31 during the manufacture thereof such that these walls do not need to be supported by supports. For this purpose, the invention envisages a preferential orientation of the guide vane 31 during the manufacture thereof with respect to the manufacturing plate T. Along the so-called "horizontal direction" orientation, the vane 31 is manufactured with the axis EV parallel with the plate T starting with the leading edge 41, due to the fact that it is thicker than the trailing edge 42, with the upper surface forming with the plate T an angle of 60° at the level of this leading edge, as seen in FIG. 6. With this arrangement, the successive layers of amalgamated powder forming this vane 31 extend along the axis EV, and the angle formed between the upper surface 38 and the plate T decreases continually with the stacked powder layers to form an angle of 0° at the level of the trailing edge. Preferentially, the span axis EV is oriented with an angle of about 2 or 3° with respect to the sweeping direction of the scraper referenced by U in FIG. 5 in order to prevent the blocking thereof, or a lamination of lower layers in the worst case.

This guide vane 31 fulfils a heat exchanger function between the air flow F passing through the aerodynamic part 32 thereof, and a hydraulic fluid circulating therein.

As seen in FIG. 7, the aerodynamic part 32 includes an internal fluid flow passage 43 delimited by the lower and upper surface walls 37 and 38, and more specifically by an inner face of the lower surface wall and an inner face of the upper surface face which are facing one another and in contact with the hydraulic fluid. This internal passage 43 comprises a first and a second channel 44 and 46 substantially parallel with the axis EV, offset from one another along a direction orthogonal to the axis EV, and connected together by an elbow connection 47. Moreover, the lower and upper surface walls 37 and 38 are connected at the level of an upstream solid zone 48 in the vicinity of the leading edge 41, a downstream solid zone 49 in the vicinity of the trailing edge 42, and at the level of a central solid zone 51. The upstream and downstream solid zones 48 and 49 extend from the foot 33 to the head 34, whereas the central solid zone 51 extends from the foot to the elbow connection 47 by being arranged along the span axis EV between the first and second internal channels to isolate same from one another outside the elbow connection 47.

The first channel 44 extends from a fluid supply orifice 52, formed at the level of the junction between the aerodynamic part 32 and the foot 33, to the elbow connection 47 while defining a first fluid propagation direction X1 therein which is substantially parallel with the span axis EV. The second channel 46 extends for its part from the elbow connection 47 to a fluid ejection orifice 53 separate from the supply orifice 52 and formed in the same way at the level of the interface between the aerodynamic part 32 and the foot 33. The second channel 46 defines a second fluid propagation direction X2 therein which is substantially parallel with the span axis EV.

The supply and ejection orifices 52 and 53 are each extended by a hollowed volume 54 in the foot 33 forming a fluidic connection between the internal passage 43 and a hydraulic circuit of the turbomachine referenced by the element 56 in FIG. 7. This hydraulic circuit 56 particularly comprises an injection pump 57 and a recovery pump 58, suitable for applying to the hydraulic fluid the desired direction of circulation along X1 and X2 respectively in the first and second channels 44 and 46. The hydraulic fluid is introduced into the internal passage 43 at the level of the supply orifice 52 through the associated connection 54, and the extraction thereof is performed by the ejection orifice 53 after having transited along the first channel and the second channel passing from one to the other via the elbow connection 47.

In practice, during the working life of the turbomachine equipped with the guide vane 31, the hydraulic fluid allowed in under the action of the injection pump 57 in the internal passage 43, has a high temperature given that it has just been used for the purposes of lubricating a gear or, as referenced herein one of the rolling bearings 19 which guides a shaft of axis AX in rotation. As this fluid moves forward in the internal passage from the supply orifice 52 to the ejection orifice 53, it is progressively cooled by the lower and upper surface walls which form heat exchange surfaces by being exposed to the cold air flow F. Once cooled, this fluid is reinjected under the action of the recovery pump 58 into the hydraulic circuit 56, and more specifically into a container 62 from which it will be once again extracted for lubrication purposes.

In the example in the figure, the first channel 44 is located on the side of the trailing edge 42, whereas the second channel 46 is located on the side of the leading edge 41. This arrangement is defined to best optimise the heat exchangers, but it should be noted that the opposite arrangement can be retained without leaving the scope of the invention.

In order to increase the heat exchange coefficient, it is envisaged to place a plurality of flow disruption elements which each connect the lower and upper surface walls 37 and 38 within the two first and second channels 44 and 46. In addition to increasing the heat exchange efficiency by increasing both the exchange surface area and adding a convective exchange component, these disruptive elements fulfil a stiffener function by each increasing the cohesion between the lower and upper surface walls. Moreover, it is noted that the elbow connection 47 defines a space preferentially free from disruptive elements in the case of the guide vane 31.

The underlying idea of the invention is that of advantageously using the ability to readily produce very complex shapes by additive manufacturing so that the fluid circulating in the internal passage 43 is disrupted as a whole. The guide vane 31 according to the invention thus requires that the disruptive elements be arranged in a disorganised manner by forming an indivisible set in repeated patterns along the first and second channel 44 and 46, to prevent any fluid propagation path not encountering a disruptive element.

Figure 8:
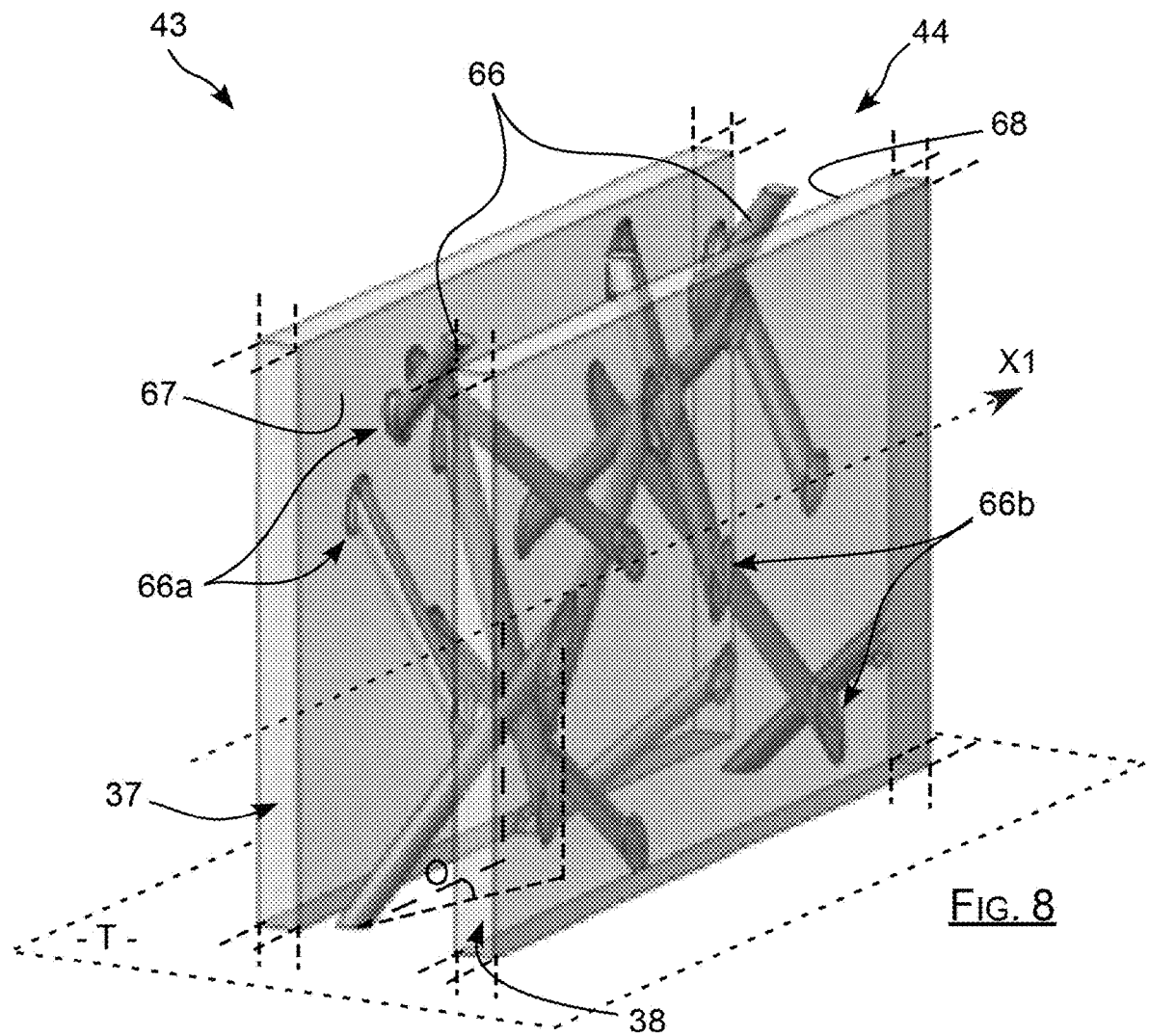
FIG. 8 is a perspective illustration of an arrangement of disruptive elements according to the invention.

As seen in FIG. 8, the first channel 44 comprises a succession of disruptive elements 66 irregularly spaced from one another and extending therethrough along the entire span thereof, in other words distributed along the fluidic flow X1. It should be noted that the description of the disruptive elements 66 is carried out for the first channel 44, given that the disruptive elements 66 in the second channel 46 observe a similar arrangement and morphology.

These disruptive elements 66 each comprise a first and a second end 66a and 66b forming respectively a connection point on the inner face of the lower surface wall referenced by 67, and on the inner face of the upper surface wall referenced by 68. The orientation of the disruptive elements is not constant along the channel extending obliquely with respect to the axis EV. Furthermore, the distribution of the connection points 66a and 66b does not observe an alignment or a particular order by forming a cloud of points without any discernible pattern in an overall view on the inner face of the lower surface wall 67 or upper surface wall 68. More specifically, the connection points 66a and 66b are not all merged with a line, particularly a line parallel with the direction X1.

With this arrangement, it should be understood that the intensity of the turbulence is increased with, in view of the fluid, current lines which are propagated three-dimensionally in the first and second channel 44 and 46. In comparison, an organised arrangement of disruptive elements, particularly oriented perpendicularly to the general fluidic direction according to the prior art, generates a disruption remaining essentially two-dimensional. It is understood that the fluid, regardless of the path thereof by bypassing the disruptive elements forming obstacles, retains a component along the fluidic direction X1 or X2. In other words, even if the fluid is disrupted locally differently according to the path followed, it retains a general propagation direction defined by the fluidic passage 43, herein X1 and X2.

This arrangement of disruptive elements 66, in addition to increasing the heat exchange by turbulence, ensures an enhanced mechanical strength. Indeed, the variety of different orientations of the disruptive elements 66 enables a superior transfer of loads between the lower and upper surface walls 37 and 38, given that for stress having a direction, there is at least one disruptive element wherein the orientation is closest to this direction, and hence takes the load peak.

Within the scope of a so-called "horizontal direction" manufacture of the vane 31, having the internal fluid passage 43 of FIG. 7 with the general fluid propagation directions X1 and X2 extending parallel with the axis EV, given that the disruptive elements 66 are manufactured at the same time as the vane, the first connection points 66a are not all included in the same plan parallel with the plate T. Similarly, the ends 66b forming a connection point with the upper surface wall 37 are not all manufactured in the same plane parallel with the plate T. In other words, the first connection points 66a, and similarly the second connection points 66b, are not manufactured simultaneously at the level of the same powder layer, or more specifically of the same succession of powder layers, forming the guide vane 31. This aspect makes it possible to do away with an accumulation of residual strain due to prolonged laser action, which otherwise, i.e. in the case of an organised arrangement and an alignment along a disruptive-wall junction line of the connection points 66a and/or 66b, would be liable to deform the material at the level of such a line and reverberate by forming projections on the outer surface of the lower and upper surface walls. For this purpose, the arrangement and the orientation of the disruptive elements 66 within the guide vane 31 is particularly compatible and well suited to the metal laser melting method, and more broadly to the powder-bed additive manufacturing method, in that manufacture with the fluidic directions X1 and X2 parallel with the plate T is permitted.

During the design phase, in other words the definition of the digital model based on which the guide vane 31 is manufactured, the disruptive elements 66 are generated at random while observing different criteria in respect of flow configuration, exchange performance and manufacturability.

Given that the hydraulic fluid will be propagated inside the internal passage 43, it cannot be envisaged that these disruptive elements 66 could collapse by forming clusters of partially amalgamated grains liable to become detached and pollute the hydraulic circuit 56. Similarly, the introduction of supports inside the internal passage 43 to support these disruptive elements 66 is excluded because, as they cannot be removed by machining, they would impair the propagation of the hydraulic fluid. For this purpose, the disruptive elements 66 must be erected from the inner lower or upper surface face 67 or 68, according to the connection point 66a or 66b from which they each start the manufacture thereof, by forming an angle greater than 30° with respect to the plate T, or indeed with respect to a plane parallel with the successive layers forming the vane 31 which are formed parallel with the plate T. Furthermore, these disruptive elements 66 are typically bars of cylindrical cross-section, in other words solid cylinders, of preferentially constant diameter of the order of 1 mm. This diameter corresponds to a minimum permissible value for which the angle formed with the plate does not induce a manufacturability problem below 70°. In other words, the disruptive elements 66 according to the invention must observe an angle with the plate, or similarly with a plane parallel with the successive layers forming the vane, of an angle value between 30° and 70°.

The disruptive elements 66 must also observe a proximity constraint, taking care not to produce a fluid passage section that is too small, generating a poor flow, or conversely too big resulting in a loss of heat exchange efficiency. The invention envisages for the guide vane 31 that the distance between two disruptive elements measured at the nearest points must be typically between 2 and 10 mm.

Finally, to ensure a significant disruption of the fluid traversing the internal passage 43, the disruptive elements 66 according to the invention must be oriented with respect to the propagation direction of this fluid by forming a so-called orientation angle O of a value between 70° and 110°, and more generally between 60 and 120°. It is understood that even if the propagation direction of the fluid varies along the internal passage 43 due to the bypass of the disruptive elements, reference is made herein to the general propagation direction of the fluid along X1 in the first channel and along X2 in the second channel 46.

Preferably, the disruptive elements 66 are generated and arranged automatically via a digital tool based on an algorithm. Once the aerodynamic part 32 and the internal passage 43 therein are modelled, as well as the orientation of manufacture with respect to the manufacturing plate T is defined, such an algorithm according to the invention consists successively of:

a) establishing firstly a cloud of random points in a plane, and preferentially on an imaginary median lower-upper surface following the skeleton 39, while ensuring that they observe the proximity constraint set between two disruptive elements, herein between 2 and 10 mm;

b) generating disruptive elements by forming solid cylinders each passing via a distinct point thus formed in a) and observing the predefined diameter, herein a value of 1 mm;

c) varying at random the orientation of the cylinders by observing the input data in respect of manufacturability angle value, herein between 30° and 70°, and orientation with respect to the fluid propagation direction O, herein between 70° and 110°;

d) evaluating the distances between the cylinders outside the plane or the median lower/upper surface and taken pairwise;

e) optimising the distances measured in d) between the cylinders by adjusting the orientation thereof while always observing the angle values from c);

f) refining as needed the relative positions of the cylinders by varying the positions of the points defined in a).

It should be noted that even if it simplifies the use of the disruptive elements 66, the invention could envisage not using a tool automatically generating these disruptive elements 66 based on such an algorithm.

In practice, the vane according to the invention comprises an internal fluid flow passage wherein disruptive elements 66 are oriented and spaced irregularly from one another according to varied parameters in a chosen and optimised interval, which ensures maximum heat exchange.

Figure 9:
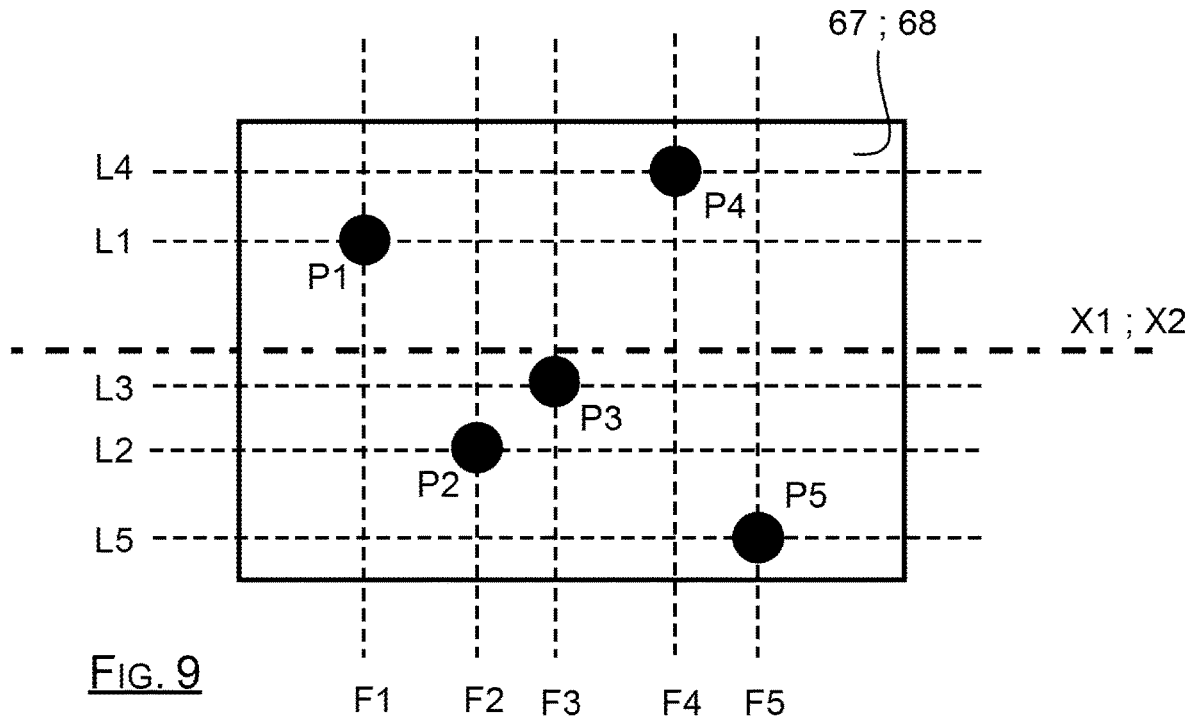
FIG. 9 is a local view of a fluid passage illustrating a connection point distribution criterion according to the invention.

In this regard, in a view from inside the internal passage and along a direction locally substantially orthogonal to/oriented towards the inner lower or upper surface face 67 and 68 as illustrated in FIG. 9 (also corresponding to a view along an orthogonal direction to the propagation direction of the fluid X1, X2), it is ideally a question of all the connection points referenced herein by P1, P2, P3, P4 and P5 being each arranged at the intersection between:

a distinct primary imaginary line L1, L2, L3, L4 and L5 extending parallel with the propagation direction of the fluid X1, X2 and, a distinct secondary imaginary line F1, F2, F3, F4 and F5 perpendicular to the associated primary imaginary line L1, L2, L3, L4 and L5.

In other words, it is ideally a question of each of the ends of the disruptive elements 66 being connected to the wall so as not to form a free propagation path locally.

In the case of the guide vane 31 with the first and second channels 44 and 46 extending parallel with the span axis EV, it is ideally a question of all the connection points formed on an inner wall face in a local view, being each arranged at the intersection between a primary imaginary line parallel with the axis EV and a distinct secondary imaginary line perpendicular to the primary imaginary line.

Figure 10:
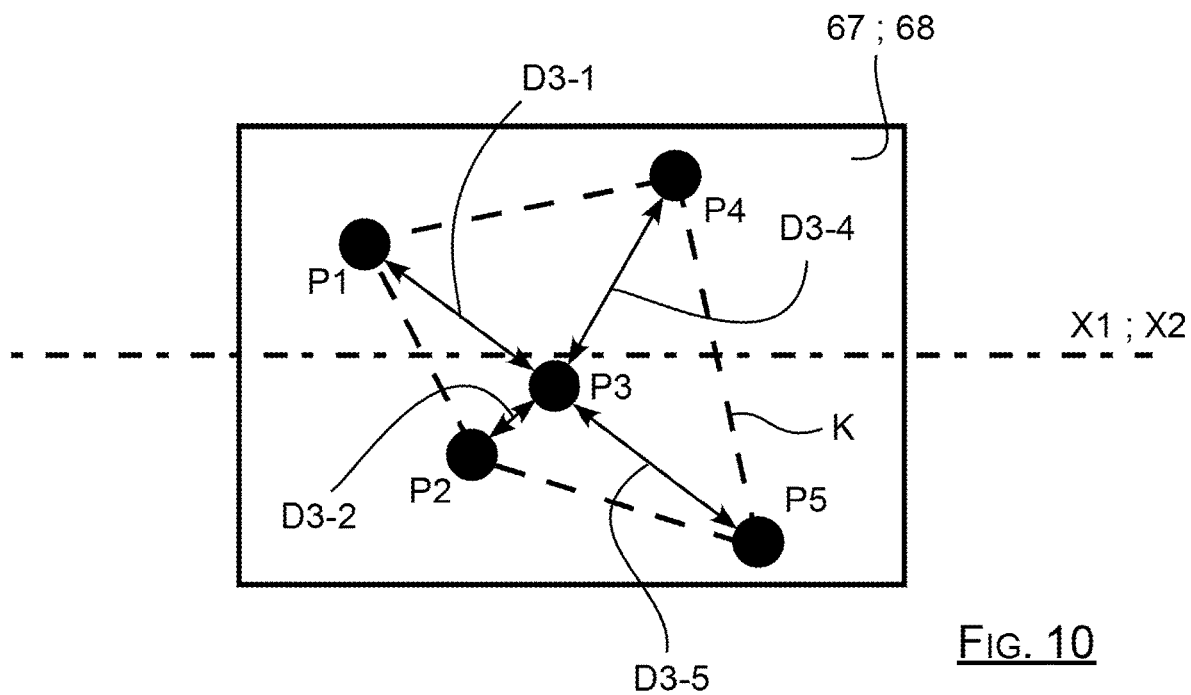
FIG. 10 is a local view of a fluid passage illustrating a connection point distance criterion according to the invention.

The definition of local corresponds herein to a confined sector beyond which the internal passage is sufficiently extended so that at least two connection points obligatorily intercept the same imaginary line. As illustrated in FIG. 10 adopting the same point distribution as in FIG. 9, this aspect is characterised particularly in that for any connection point P3 having about same a number N greater than 3 of connection points, herein P1, P2, P4 and P5, formed on the same inner wall face and forming a closed line K delimiting internally a space wherein said any connection point P3 is located, the distance D3-1, D3-2, D3-4, D3-5 between the latter and each of said N points is different for at least three thereof, and preferably for each thereof.

In the example in FIGS. 5 and 6, the guide vane 31 is manufactured "in the horizontal direction" with the span axis EV thereof parallel with the plate T. However, it should be noted that the invention is not limited to this direction of manufacture and could for example envisage a so-called "upright direction" alternative, with the vane 31 manufactured bearing on one of the platforms thereof, i.e. starting the manufacture on the plate from a platform. Unlike "horizontal direction" manufacturing, particularly aimed at maximising the manufacturable length while reducing the manufacturing height to optimise the manufacturing time, this alternative favours the reduction of supports on the aerodynamic profile to minimise finishing operations. Furthermore, this "upright direction" alternative makes it possible to increase the number of vanes 31 that can be manufactured simultaneously on the same plate T.

Similarly, it should be noted that the distribution of the disruptive elements 66 according to the invention is not limited in that they follow the span axis EV of the vane, given that the internal passage 43 can have a different morphology to that illustrated in FIG. 7, such as for example coiled, without leaving the scope of the invention. In concrete terms, the formation of the disruptive elements 66 according to the invention is applicable regardless of the direction of manufacture of the aerodynamic part 32, and more specifically the orientation(s) of the fluidic passage 43 therein, once the minimum clearance angle A and orientation angle O values are observed.

It is a question of specifying however that the value of this minimum clearance angle A is not necessarily equal to 30°, given that it is particularly dependent on the nature of the powder used and the machine used. In this regard, the invention could envisage that the disruptive elements form an angle with the plate T of a different value to observe a new angle value A induced by a change of material and/or additive manufacturing method, such as for example using a titanium alloy.

It is further to be noted that the distance between two disruptive elements as well as the orientation angle value O are modifiable without leaving the scope of the invention, given that these parameters are dependent on the nature of the fluid circulating in the internal passage of the vane, and more specifically the viscosity thereof.

As regards the disruptive elements 66, the invention is not limited to solid cylinders, and enables the use of various shapes such as for example with an ovoid, rectangular, triangular, parallelepipedal, conical, prismatic cross-section, or any other shape, once a heat exchange is carried out between the fluid which moulds the contour thereof and the flow crossing the outer surface of the upper and lower surface walls. Similarly, the diameter thereof can be modified according to the number of disruptive elements 66 sought within the internal passage and the conduction constraints. The invention could particularly envisage that the diameter exceeds 1 mm, which allows them to form an angle with the plate T in excess of 70°.

As a general rule, the vane according to the invention comprises an internal fluid flow passage 43 wherein the disruptive elements 66 are envisaged and the arrangement whereof makes it possible to:
increase the heat exchange potential by reinforcing the turbulence of the hydraulic fluid,
increase the mechanical strength of the aerodynamic part by taking a broad spectrum of directions of stress, and
limit the incidence of the powder-bed additive manufacturing method on the material health of the vane, and particularly at the level of the outer surface of the lower and upper surface walls, this specificity being revealed when all or part of an internal fluid passage channel extends parallel with the plate T during the manufacture of the aerodynamic part. Indeed, the geometric configuration of the disruptive elements make it possible to limit the lasing time associated with the formation of constituent layer of the aerodynamic part, given that all these elements are not erected from/completed on the inner face of a lower or upper surface wall at the level of the same layer or succession of powder layers. In other words, given that such an arrangement of disruptive elements 66 will not penalise the resistance of the vane for a given orientation, the invention enables greater flexibility of design of the internal fluidic passage 43 and of orientation of the vane during the manufacture thereof.

In the example in FIG. 8, the arrangement of the disruptive elements 66 is particularly effective for increasing the turbulence of the fluid, but it should be noted that the invention could envisage a "dissymmetrical" distribution with only the first or the second connection points being disorganised whereas the others being aligned or forming a repeatable pattern as needed. This "asymmetrical" distribution could be preferred based on the specific case, to particularly fulfil a further performance condition.

Finally, the specific arrangement of the disruptive elements 66 according to the invention has been explained herein for the case where they equip an internal passage 43 of a guide vane 31 wherein a hydraulic fluid needing to be cooled circulates. In concrete terms, this arrangement of the disruptive elements 66 according to the invention finds the application thereof in the general field of vanes manufactured in one piece by powder-bed additive manufacturing comprising an internal fluid flow passage wherein these disruptive elements maximise the wetted surface and the convection phenomenon. By way of example, the invention could envisage a turbine vane placed at the combustion chamber 8 outlet and the internal passage whereof fulfils this time a function of cooling the lower and upper surface walls with a fresh air flow, extracted upstream from combustion, which advance along this internal passage while being disrupted by a set of disruptive elements 66 thus defined.

What is claimed is:

1. Aircraft turbomachine vane comprising an aerodynamic part (32) extending along a span axis (EV) and made of one piece by additive manufacturing, said aerodynamic part comprising a lower surface wall (37) and an upper surface wall (38) comprising respectively an inner lower surface face (67) and an inner upper surface face (68), these inner lower and upper surface faces (67, 68) facing one another and delimiting jointly an internal fluid passage (43) comprising at least one channel (44; 46) defining a general fluid propagation direction (X1; X2) therein, this channel being traversed by a plurality of flow disruption elements (66) connecting the lower and upper surface walls (37, 38) each having a first connection point (66a) on the inner lower surface face (67), and a second connection point (66b) on the inner upper surface face (68), wherein the disruptive elements extend in relation to the general fluid propagation direction (X1; X2) by forming a variable angle from one disruptive element to another, and in that the disruptive elements (66) are irregularly spaced from one another such that the first connection points (66a) are arranged in a disorganised manner on the inner lower surface face (67), and/or the second connection points (66b) are arranged in a disorganised manner on the inner upper surface face (68).

2. Vane according to claim 1, wherein the internal fluid passage (43) comprises a first and a second channel (44, 46) each defining a fluid propagation direction (X1, X2) substantially parallel with the span axis (EV), these first and second channels (44, 46) being traversed by disruptive elements (66) the first and second connection points (66a, 66b) whereof do not follow a specific alignment along the fluid propagation direction (X1, X2).

3. Vane according to claim 1, wherein for any connection point (66a, 66b) among the first connection points (66a) and/or the second connection points arranged in a disorganised manner, this connection point has around same a number N of connection points forming a closed line, delimiting internally a space wherein the single any connection point is found, the distance between the latter is each of said N points is different for at least three thereof, and preferably for each thereof.

4. Vane according to claim 1, wherein,
in a view from inside the fluid passage (43), along a direction locally substantially orthogonal to and oriented towards the inner lower surface face (67), all the first connection points (66a) thereof are each arranged at the intersection between a primary imaginary line (L1, L2, L3, L4, L5) extending parallel with the fluid propagation direction (X1, X2), and a secondary imaginary line (F1, F2, F3, F4, F5) perpendicular to the primary imaginary line, all of the first imaginary lines being all distinct from one another and all of the second imaginary lines being all distinct from one another; and/or
in a view from inside the fluid passage (43), along a direction locally substantially orthogonal to and oriented towards the inner upper surface face (68), all the second connection points (66b) thereof are each arranged at the intersection between a primary imaginary line extending parallel with the fluid propagation direction (X1, X2), and a secondary imaginary line perpendicular to the primary imaginary line, all of the first imaginary lines between all distinct from one another and all of the second imaginary lines being all distinct from one another.

5. Vane according to claim 1, wherein the disruptive elements are spaced pairwise at the nearest point by a distance enabling fluid flow, this distance being preferentially between 2 and 10 mm.

6. Vane according to claim 1, wherein the value of the angle formed between each disruptive element (66) and the fluid propagation direction (X1; X2) is between 70 and 110°.

7. Vane according to claim 1, wherein the disruptive elements (66) extend by forming an angle greater than a predefined angle A with respect to a parallel plane with the successive manufacturing layers forming the aerodynamic part of the vane below which these disruptive elements should be supported during manufacture, the angle A being preferentially greater than 30°.

8. Vane according to claim 1, wherein the disruptive elements (66) extend by forming an angle of less than 70° with respect to a parallel plane with the successive layers forming the vane.

9. Vane according to claim 1, wherein the disruptive elements are bars with a cylindrical cross-section of diameter of the order of 1 mm.

10. Aircraft engine comprising at least one vane according to claim 1.

11. Additive manufacturing method of a vane according to claim 1, by stacking on a plate T of material layers forming the vane from the leading edge thereof, during which the span axis (EV) is parallel with the plate T and the upper surface wall forms with the plate T an angle which decreases with the stacked layers.

* * * * *